US010070291B2

(12) United States Patent
Candelore

(10) Patent No.: US 10,070,291 B2
(45) Date of Patent: Sep. 4, 2018

(54) PROXIMITY DETECTION OF CANDIDATE COMPANION DISPLAY DEVICE IN SAME ROOM AS PRIMARY DISPLAY USING LOW ENERGY BLUETOOTH

(71) Applicant: Sony Corporation, Tokyo (JP)

(72) Inventor: Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/281,158

(22) Filed: May 19, 2014

(65) Prior Publication Data

US 2015/0331655 A1 Nov. 19, 2015

(51) Int. Cl.
*H04W 4/80* (2018.01)
*G06F 3/14* (2006.01)
*H04W 4/04* (2009.01)
*H04W 4/02* (2018.01)

(52) U.S. Cl.
CPC ............ *H04W 4/80* (2018.02); *G06F 3/1423* (2013.01); *H04W 4/02* (2013.01); *H04W 4/04* (2013.01); *G09G 2370/04* (2013.01); *G09G 2370/16* (2013.01)

(58) Field of Classification Search
CPC ....... G06F 3/1423; H04W 4/008; H04W 4/04; H04W 4/80; H04W 4/02
See application file for complete search history.

(56) References Cited

U.S. PATENT DOCUMENTS

| 6,008,777 | A | 12/1999 | Yiu |
| 6,100,925 | A | 8/2000 | Rosser et al. |
| 6,111,517 | A | 8/2000 | Atick et al. |
| 6,301,370 | B1 | 10/2001 | Steffens et al. |
| 6,643,650 | B1 | 11/2003 | Slaughter et al. |
| 6,789,077 | B1 | 9/2004 | Slaughter et al. |
| 6,789,126 | B1 | 9/2004 | Saulpaugh et al. |
| 6,792,466 | B1 | 9/2004 | Saulpaugh et al. |
| 6,850,979 | B1 | 2/2005 | Saulpaugh et al. |
| 6,862,594 | B1 | 3/2005 | Saulpaugh et al. |
| 6,868,447 | B1 | 3/2005 | Slaughter et al. |

(Continued)

FOREIGN PATENT DOCUMENTS

| JP | 2005192098 A | 7/2005 |
| JP | 2010200275 A | 2/2009 |

(Continued)

OTHER PUBLICATIONS

Brant Candelore, "Proximity Detection of Candidate Companion Display Device in Same Room As Primary Display Using UPNP", related U.S. Appl. No. 14/262,051, Non-Final Office Action dated Mar. 12, 2015.

(Continued)

*Primary Examiner* — Gennadiy Tsvey

(74) *Attorney, Agent, or Firm* — John L. Rogitz

(57) ABSTRACT

A candidate companion screen device is located by a primary display device as being in the same room as the primary device using low energy Bluetooth, and in response ancillary content related to content being shown on the primary display device is provided to the companion screen device. The ancillary content may be provided from the Internet based on information in the content being presented on the primary display device by, e.g., providing a link to a website to the companion device.

18 Claims, 3 Drawing Sheets

(56) References Cited

U.S. PATENT DOCUMENTS

| | | |
|---|---|---|
| 6,898,618 B1 | 5/2005 | Slaughter et al. |
| 6,910,068 B2 | 6/2005 | Zintel et al. |
| 6,917,976 B1 | 7/2005 | Slaughter et al. |
| 6,918,084 B1 | 7/2005 | Slaughter et al. |
| 6,950,875 B1 | 9/2005 | Slaughter et al. |
| 6,970,869 B1 | 11/2005 | Slaughter et al. |
| 6,973,493 B1 | 12/2005 | Slaughter et al. |
| 7,010,573 B1 | 3/2006 | Saulpaugh et al. |
| 7,016,966 B1 | 3/2006 | Saulpaugh et al. |
| 7,065,574 B1 | 6/2006 | Saulpaugh et al. |
| 7,072,967 B1 | 7/2006 | Saulpaugh et al. |
| 7,080,078 B1 | 7/2006 | Slaughter et al. |
| 7,188,251 B1 | 3/2007 | Slaughter et al. |
| 7,200,848 B1 | 4/2007 | Slaughter et al. |
| 7,243,356 B1 | 7/2007 | Saulpaugh et al. |
| 7,260,543 B1 | 8/2007 | Saulpaugh et al. |
| 7,370,091 B1 | 5/2008 | Slaughter et al. |
| 7,395,333 B1 | 7/2008 | Saulpaugh et al. |
| 7,398,533 B1 | 7/2008 | Slaughter et al. |
| 7,412,518 B1 | 8/2008 | Duigou et al. |
| 7,426,721 B1 | 9/2008 | Saulpaugh et al. |
| 7,437,434 B2 | 10/2008 | Zintel et al. |
| 7,441,019 B2 | 10/2008 | Zintel et al. |
| 7,444,644 B1 | 10/2008 | Slaughter et al. |
| 7,458,082 B1 | 11/2008 | Slaughter et al. |
| 7,499,574 B1 | 3/2009 | Yang et al. |
| 7,548,946 B1 | 6/2009 | Saulpaugh et al. |
| 7,577,834 B1 | 8/2009 | Traversat et al. |
| 7,680,041 B2 | 3/2010 | Johansen |
| 7,689,613 B2 | 3/2010 | Candelore |
| 7,693,895 B2 | 4/2010 | Takayama et al. |
| 7,716,385 B2 | 5/2010 | Saint-Hilaire et al. |
| 7,716,492 B1 | 5/2010 | Saulpaugh et al. |
| 7,725,912 B2 | 5/2010 | Margulis |
| 7,796,190 B2 | 9/2010 | Basso et al. |
| 7,991,873 B2 | 8/2011 | Kato et al. |
| 8,001,232 B1 | 8/2011 | Saulpaugh et al. |
| 8,019,883 B1 | 9/2011 | Margulis |
| 8,068,095 B2 | 11/2011 | Pryor |
| 8,078,230 B2 | 12/2011 | Schuler et al. |
| 8,079,055 B2 | 12/2011 | Hardacker et al. |
| 8,082,491 B1 | 12/2011 | Abdelaziz et al. |
| 8,112,513 B2 | 2/2012 | Margulis |
| 8,135,796 B1 | 3/2012 | Slaughter et al. |
| 8,184,141 B2 | 5/2012 | Caspi et al. |
| 8,200,796 B1 | 6/2012 | Margulis |
| 8,208,729 B2 | 6/2012 | Foss |
| 8,218,821 B2 | 7/2012 | Sefton et al. |
| 8,219,720 B2 | 7/2012 | Saint-Hilaire et al. |
| 8,220,020 B2 | 7/2012 | Deshpande |
| 8,233,675 B2 | 7/2012 | Reed et al. |
| 8,285,006 B2 | 10/2012 | Tang |
| 8,296,808 B2 | 10/2012 | Hardacker et al. |
| 8,320,674 B2 | 11/2012 | Guillou et al. |
| 8,347,319 B2 | 1/2013 | Greeff et al. |
| 8,356,251 B2 | 1/2013 | Strober |
| 8,365,223 B2 | 1/2013 | Watanabe et al. |
| 8,392,597 B2 | 3/2013 | Kim et al. |
| 8,397,264 B2 | 3/2013 | Ansari et al. |
| 8,413,223 B2 | 4/2013 | Akiyama et al. |
| 8,438,589 B2 | 5/2013 | Candelore |
| 8,494,231 B2 | 7/2013 | Folta et al. |
| 8,561,069 B2 | 10/2013 | Masuoka et al. |
| 8,571,598 B2 | 10/2013 | Valavi |
| 8,588,131 B2 | 11/2013 | Sato et al. |
| 8,614,668 B2 | 12/2013 | Pryor |
| 8,620,949 B2 | 12/2013 | Son et al. |
| 8,621,498 B2 | 12/2013 | Candelore |
| 8,629,942 B2 | 1/2014 | Candelore |
| 8,643,703 B1 | 2/2014 | Karakotsios et al. |
| 8,649,652 B2 | 2/2014 | Kageyama et al. |
| 8,695,044 B1 | 4/2014 | Islam et al. |
| 9,100,688 B2 | 8/2015 | Shigeta et al. |
| 9,344,632 B2 | 5/2016 | Arai et al. |
| 2001/0037499 A1 | 11/2001 | Turock et al. |
| 2002/0029256 A1 | 3/2002 | Zintel et al. |
| 2002/0054206 A1 | 5/2002 | Allen |
| 2002/0078161 A1 | 6/2002 | Cheng |
| 2002/0083143 A1 | 6/2002 | Cheng |
| 2002/0122137 A1 | 9/2002 | Chen et al. |
| 2003/0009771 A1 | 1/2003 | Chang |
| 2003/0046685 A1 | 3/2003 | Srinivasan et al. |
| 2003/0107677 A1 | 6/2003 | Lu et al. |
| 2003/0192054 A1 | 10/2003 | Birks et al. |
| 2003/0210337 A1 | 11/2003 | Hall |
| 2004/0003073 A1 | 1/2004 | Krzyzanowski et al. |
| 2004/0068752 A1 | 4/2004 | Parker |
| 2004/0230636 A1 | 11/2004 | Masuoka et al. |
| 2005/0010787 A1 | 1/2005 | Tarbouriech |
| 2005/0024324 A1 | 2/2005 | Tomasi et al. |
| 2005/0074018 A1 | 4/2005 | Zintel et al. |
| 2005/0097503 A1 | 5/2005 | Zintel et al. |
| 2005/0125820 A1 | 6/2005 | Nelson et al. |
| 2005/0134578 A1 | 6/2005 | Chambers et al. |
| 2006/0064720 A1 | 3/2006 | Istvan et al. |
| 2006/0095941 A1 | 5/2006 | Fidler et al. |
| 2006/0184851 A1 | 8/2006 | Froidcoeur et al. |
| 2006/0195866 A1 | 8/2006 | Thukral |
| 2006/0218602 A1 | 9/2006 | Sherer et al. |
| 2007/0192813 A1* | 8/2007 | Kim ............... H04N 7/163 725/100 |
| 2007/0200916 A1 | 8/2007 | Han |
| 2007/0230786 A1 | 10/2007 | Foss |
| 2007/0280534 A1 | 12/2007 | Foss |
| 2008/0002609 A1 | 1/2008 | Caldwell et al. |
| 2008/0013801 A1 | 1/2008 | Reed et al. |
| 2008/0016467 A1 | 1/2008 | Chambers et al. |
| 2008/0059179 A1 | 3/2008 | Lagadec |
| 2008/0059300 A1 | 3/2008 | Hamoui |
| 2008/0089288 A1 | 4/2008 | Anschutz et al. |
| 2008/0112405 A1 | 5/2008 | Cholas et al. |
| 2008/0146265 A1 | 6/2008 | Valavi |
| 2008/0175479 A1 | 7/2008 | Sefton et al. |
| 2008/0204273 A1 | 8/2008 | Crystal et al. |
| 2008/0227500 A1 | 9/2008 | Heyworth et al. |
| 2008/0259222 A1 | 10/2008 | Hardacker et al. |
| 2008/0279425 A1 | 11/2008 | Tang |
| 2008/0279453 A1 | 11/2008 | Candelore |
| 2008/0313670 A1 | 12/2008 | Ho et al. |
| 2009/0037951 A1 | 2/2009 | Candelore et al. |
| 2009/0041310 A1 | 2/2009 | Yang et al. |
| 2009/0041418 A1 | 2/2009 | Candelore et al. |
| 2009/0057868 A1 | 3/2009 | Wang et al. |
| 2009/0150217 A1 | 6/2009 | Luff |
| 2009/0150569 A1 | 6/2009 | Kumar et al. |
| 2009/0161600 A1 | 6/2009 | Sato et al. |
| 2009/0172744 A1 | 7/2009 | Rothschild |
| 2009/0195638 A1 | 8/2009 | Caspi et al. |
| 2009/0216606 A1 | 8/2009 | Coffman et al. |
| 2009/0313675 A1 | 12/2009 | Howarter et al. |
| 2009/0327892 A1 | 12/2009 | Douillet et al. |
| 2010/0042925 A1 | 2/2010 | DeMartin et al. |
| 2010/0050006 A1 | 2/2010 | Nishibayashi et al. |
| 2010/0093286 A1* | 4/2010 | Noda ............... H04W 48/14 455/67.11 |
| 2010/0125884 A1 | 5/2010 | Howcroft |
| 2010/0231790 A1 | 9/2010 | Ansari et al. |
| 2010/0273420 A1 | 10/2010 | Mabuchi |
| 2010/0315549 A1 | 12/2010 | Basso et al. |
| 2011/0029362 A1 | 2/2011 | Roeding et al. |
| 2011/0029370 A1 | 2/2011 | Roeding et al. |
| 2011/0041174 A1 | 2/2011 | Akiyama et al. |
| 2011/0047239 A1 | 2/2011 | Choi et al. |
| 2011/0072464 A1 | 3/2011 | Watanabe et al. |
| 2011/0103773 A1 | 5/2011 | Johnson et al. |
| 2011/0106618 A1 | 5/2011 | Ben-Moshe |
| 2011/0109751 A1 | 5/2011 | Chang et al. |
| 2011/0115698 A1 | 5/2011 | Chung et al. |
| 2011/0115818 A1 | 5/2011 | Chung et al. |
| 2011/0116419 A1 | 5/2011 | Cholas et al. |
| 2011/0119393 A1 | 5/2011 | Kim et al. |
| 2011/0128378 A1 | 6/2011 | Raji |
| 2011/0157467 A1 | 6/2011 | McRae |
| 2011/0202954 A1 | 8/2011 | Oka et al. |

(56) References Cited

U.S. PATENT DOCUMENTS

| | | |
|---|---|---|
| 2011/0216753 A1 | 9/2011 | Kneckt et al. |
| 2011/0235624 A1 | 9/2011 | Scott et al. |
| 2011/0246291 A1 | 10/2011 | Paul |
| 2011/0289460 A1 | 11/2011 | Dow et al. |
| 2012/0011550 A1 | 1/2012 | Holland |
| 2012/0069131 A1 | 3/2012 | Abelow |
| 2012/0077586 A1 | 3/2012 | Pishevar |
| 2012/0079080 A1 | 3/2012 | Pishevar |
| 2012/0079368 A1 | 3/2012 | Abdelaziz et al. |
| 2012/0089923 A1 | 4/2012 | Pettit et al. |
| 2012/0095779 A1* | 4/2012 | Wengrovitz ............ G06Q 50/24 705/3 |
| 2012/0106806 A1 | 5/2012 | Folta et al. |
| 2012/0143902 A1 | 6/2012 | Son et al. |
| 2012/0158972 A1 | 6/2012 | Gammill et al. |
| 2012/0159531 A1 | 6/2012 | O'Callaghan |
| 2012/0173755 A1 | 7/2012 | Margulis |
| 2012/0174155 A1 | 7/2012 | Mowrey et al. |
| 2012/0206391 A1 | 8/2012 | Kim et al. |
| 2012/0208466 A1 | 8/2012 | Park et al. |
| 2012/0208514 A1 | 8/2012 | Park et al. |
| 2012/0209878 A1 | 8/2012 | Park et al. |
| 2012/0210275 A1 | 8/2012 | Park et al. |
| 2012/0218191 A1 | 8/2012 | Huang et al. |
| 2012/0220224 A1 | 8/2012 | Walker |
| 2012/0254292 A1 | 10/2012 | Newton et al. |
| 2012/0254929 A1 | 10/2012 | Oztaskent et al. |
| 2012/0254931 A1 | 10/2012 | Oztaskent et al. |
| 2012/0270502 A1 | 10/2012 | Kazawa |
| 2012/0272158 A1 | 10/2012 | Weskamp et al. |
| 2012/0291067 A1 | 11/2012 | Wiles |
| 2012/0291072 A1 | 11/2012 | Maddison et al. |
| 2012/0297412 A1 | 11/2012 | Dasher et al. |
| 2012/0314914 A1 | 12/2012 | Karakotsios et al. |
| 2012/0320278 A1 | 12/2012 | Yoshitani et al. |
| 2013/0003822 A1 | 1/2013 | Margulis |
| 2013/0042292 A1 | 2/2013 | Buff et al. |
| 2013/0052997 A1 | 2/2013 | Killick et al. |
| 2013/0054697 A1 | 2/2013 | Cha |
| 2013/0055323 A1 | 2/2013 | Venkitaraman et al. |
| 2013/0058593 A1 | 3/2013 | Kanalakis et al. |
| 2013/0059547 A1 | 3/2013 | Kim et al. |
| 2013/0065526 A1 | 3/2013 | Pottier et al. |
| 2013/0091208 A1 | 4/2013 | Rajakarunanayake et al. |
| 2013/0091209 A1 | 4/2013 | Bennett et al. |
| 2013/0091212 A1 | 4/2013 | Rajakarunanayake |
| 2013/0109371 A1 | 5/2013 | Brogan et al. |
| 2013/0110900 A1 | 5/2013 | Jardins et al. |
| 2013/0111347 A1 | 5/2013 | Reilly et al. |
| 2013/0117698 A1 | 5/2013 | Park et al. |
| 2013/0133013 A1 | 5/2013 | Kang et al. |
| 2013/0138265 A1 | 5/2013 | Kim et al. |
| 2013/0138728 A1 | 5/2013 | Kim et al. |
| 2013/0205022 A1 | 8/2013 | Kagan et al. |
| 2013/0205319 A1 | 8/2013 | Sinha et al. |
| 2013/0210353 A1 | 8/2013 | Ling et al. |
| 2013/0229577 A1 | 9/2013 | McRae |
| 2013/0237156 A1 | 9/2013 | Jung et al. |
| 2013/0238538 A1 | 9/2013 | Cook et al. |
| 2013/0238702 A1 | 9/2013 | Sheth et al. |
| 2013/0249791 A1 | 9/2013 | Pryor |
| 2013/0265221 A1 | 10/2013 | Lee et al. |
| 2013/0265232 A1 | 10/2013 | Yun et al. |
| 2013/0265257 A1 | 10/2013 | Jung et al. |
| 2013/0265260 A1 | 10/2013 | Seo et al. |
| 2013/0265262 A1 | 10/2013 | Jung et al. |
| 2013/0268401 A1 | 10/2013 | Choi et al. |
| 2013/0298179 A1 | 11/2013 | Baum et al. |
| 2013/0305293 A1 | 11/2013 | Watanabe et al. |
| 2013/0309971 A1 | 11/2013 | Kiukkonen et al. |
| 2013/0310064 A1 | 11/2013 | Brachet et al. |
| 2013/0312018 A1 | 11/2013 | Elliott et al. |
| 2013/0317905 A1 | 11/2013 | Warner et al. |
| 2013/0321268 A1 | 12/2013 | Tuck et al. |
| 2013/0325396 A1 | 12/2013 | Yuen et al. |
| 2013/0325954 A1 | 12/2013 | Cupala et al. |
| 2013/0326552 A1 | 12/2013 | Adams |
| 2013/0332957 A1 | 12/2013 | DeWeese et al. |
| 2013/0338804 A1 | 12/2013 | Sheen |
| 2013/0339996 A1 | 12/2013 | Davis et al. |
| 2013/0342454 A1 | 12/2013 | Choi et al. |
| 2013/0342455 A1 | 12/2013 | Choi et al. |
| 2013/0347018 A1* | 12/2013 | Limp ................ H04N 21/4826 725/19 |
| 2014/0004934 A1 | 1/2014 | Peterson et al. |
| 2014/0009476 A1 | 1/2014 | Venkitaraman et al. |
| 2014/0011448 A1 | 1/2014 | Yang |
| 2014/0015743 A1 | 1/2014 | Seo et al. |
| 2014/0019005 A1 | 1/2014 | Lee et al. |
| 2014/0026193 A1 | 1/2014 | Saxman et al. |
| 2014/0028596 A1 | 1/2014 | Seo et al. |
| 2014/0032327 A1 | 1/2014 | Prakash et al. |
| 2014/0032635 A1 | 1/2014 | Pimmel et al. |
| 2014/0047392 A1 | 2/2014 | Kim et al. |
| 2014/0049463 A1 | 2/2014 | Seo et al. |
| 2014/0049464 A1 | 2/2014 | Kwak et al. |
| 2014/0049593 A1 | 2/2014 | Pai et al. |
| 2014/0055344 A1 | 2/2014 | Seo et al. |
| 2014/0055429 A1 | 2/2014 | Kwon et al. |
| 2014/0055681 A1 | 2/2014 | Murugesan |
| 2014/0059419 A1 | 2/2014 | Devises |
| 2014/0068719 A1 | 3/2014 | Kiukkonen et al. |
| 2014/0087752 A1 | 3/2014 | Zhu et al. |
| 2014/0113674 A1 | 4/2014 | Joseph et al. |
| 2014/0146877 A1 | 5/2014 | Delegue et al. |
| 2014/0156186 A1 | 6/2014 | Liu et al. |
| 2014/0214543 A1 | 7/2014 | Gandhi |
| 2014/0214924 A1 | 7/2014 | Cha et al. |
| 2014/0253469 A1 | 9/2014 | Hicks et al. |
| 2014/0316875 A1 | 10/2014 | Tkachenko et al. |
| 2014/0331264 A1 | 11/2014 | Schneiderman et al. |
| 2014/0358685 A1 | 12/2014 | Want et al. |
| 2014/0362728 A1* | 12/2014 | Krochmal ............. H04W 76/00 370/254 |
| 2015/0006266 A1 | 1/2015 | Huang et al. |
| 2015/0046269 A1 | 2/2015 | Liu et al. |
| 2015/0120457 A1 | 4/2015 | Miller et al. |
| 2015/0140930 A1 | 5/2015 | Chen |
| 2015/0154134 A1 | 6/2015 | Beaumont et al. |
| 2015/0181268 A1 | 6/2015 | Navin et al. |
| 2015/0186921 A1 | 7/2015 | Want et al. |
| 2015/0187186 A1 | 7/2015 | Want et al. |
| 2015/0193516 A1 | 7/2015 | Harb |
| 2015/0220162 A1 | 8/2015 | Vendrow |
| 2015/0220296 A1* | 8/2015 | Lin ....................... H04W 76/14 345/2.3 |
| 2015/0249913 A1 | 9/2015 | Hua et al. |
| 2015/0271312 A1 | 9/2015 | Want et al. |
| 2015/0331559 A1 | 11/2015 | Antonelli et al. |
| 2015/0333819 A1 | 11/2015 | Candelore |
| 2015/0373663 A1 | 12/2015 | Bao et al. |
| 2016/0078484 A1 | 3/2016 | Emigh et al. |
| 2016/0117738 A1 | 4/2016 | Shen et al. |
| 2016/0330528 A1 | 11/2016 | Tse |

FOREIGN PATENT DOCUMENTS

| | | |
|---|---|---|
| JP | 2013223085 | 4/2012 |
| JP | 2013055380 A | 3/2013 |
| KR | 1020130059124 A | 6/2013 |
| WO | 2012046276 A1 | 4/2012 |

OTHER PUBLICATIONS

Brant Candelore, "Proximity Detection of Candidate Companion Display Device in Same Room As Primary Display Using UPNP", related U.S. Appl. No. 14/262,051, Applicant's response to Non-Final Office Action dated Mar. 12, 2015.

UPnP Forum—UPnP Device Architecture 1.0, Oct. 15, 2008.

Brant Candelore, "Proximity Detection of Candidate Companion Display Device in Same Room As Primary Display Using UPNP",

(56) References Cited

OTHER PUBLICATIONS related U.S. Appl. No. 14/262,051, Final Office Action dated Jun. 5, 2015.
Brant Candelore, "Proximity Detection of Candidate Companion Display Device in Same Room As Primary Display Using UPNP", related U.S. Appl. No. 14/262,051, Applicant's response to Final Office Action dated Jun. 8, 2015.
Brant Candelore, "Proximity Detection of Candidate Companion Display Device in Same Room as Primary Display Using Infrared Signaling", file history of related U.S. Appl. No. 14/202,309, filed Mar. 10, 2014.
Brant Candelore, "Proximity Detection of Candidate Companion Display Device in Same Room as Primary Display Using Camera", file history of related U.S. Appl. No. 14/264,435, filed Apr. 29, 2014.
Brant Candelore, "Proximity Detection of Candidate Companion Display Device in Same Room as Primary Display Using Sonic Signaling", file history of related U.S. Appl. No. 14/278,383, filed May 15, 2014.
Sriram Sampathkumaran, "Recognized and Registering Faces in Video", file history of related pending U.S. Appl. No. 14/244,155, filed Apr. 3, 2014.
Brant Candelore, "Proximity Detection of Candidate Companion Display Device in Same Room as Primary Display Using UPNP", file history of related pending U.S. Appl. No. 14/262,051, filed Apr. 25, 2014.
Brant Candelore, "Proximity Detection of Candidate Companion Display Device in Same Room as Primary Display Using UPNP", related U.S. Appl. No. 14/262,051, Non-Final Office Action dated Jul. 17, 2015.
Brant Candelore, "Proximity Detection of Candidate Companion Display Device in Same Room as Primary Display Using UPNP", related U.S. Appl. No. 14/262,051, Applicant's response to Non-Final Office Action dated Jul. 21, 2015.
Brant Candelore, "Proximity Detection of Candidate Companion Display Device in Same Room as Primary Display Using Infrared Signaling", related U.S. Appl. No. 14/262,051, Final Office Action dated Sep. 25, 2015.
Brant Candelore, "Proximity Detection of Candidate Companion Display Device in Same Room as Primary Display Using Infrared Signaling", related U.S. Appl. No. 14/262,051, Applicant's response to Final Office Action dated Oct. 19, 2015.
Brant Candelore, "Proximity Detection of Candidate Companion Display Device in Same Room as Primary Display Using Camera", related U.S. Appl. No. 14/264,435, Non-Final Office Action dated Nov. 6, 2015.
Brant Candelore, "Proximity Detection of Candidate Companion Display Device in Same Room as Primary Display Using Camera", related U.S. Appl. No. 14/264,435, Applicant's response to Non-Final Office Action dated Nov. 10, 2015.
Brant Candelore, "Proximity Detection of Candidate Companion Display Device in Same Room as Primary Display Using UPNP", related U.S. Appl. No. 14/262,051, Non-Final Office Action dated Dec. 17, 2015.
Brant Candelore, "Proximity Detection of Candidate Companion Display Device in Same Room as Primary Display Using UPNP", related U.S. Appl. No. 14/262,051, Applicant's response to Non-Final Office Action dated Dec. 22, 2015.
Brant Candelore, "Proxmitiy Detection of Candidate Companion Display Device in Same Room as Primary Display Using Sonic Signaling", related U.S. Appl. No. 14/278,383, Applicant's response to Non-Final Office Action dated Apr. 4, 2016.
Brant Candelore, "Proxmitiy Detection of Candidate Companion Display Device in Same Room as Primary Display Using UPNP", related Appl. No. 14/262,051, Final Office Action dated Mar. 3, 2016.
Brant Candelore, "Proxmitiy Detection of Candidate Companion Display Device in Same Room as Primary Display Using UPNP", related U.S. Appl. No. 14/262,051, Applicant's response to Final Office Action filed Apr. 4, 2016.
Brant Candelore, "Proximity Detection of Candidate Companion Display Device in Same Room as Primary Display Using Camera", related U.S. Appl. No. 14/264,435, Final Office Action dated Feb. 2, 2016.
Brant Candelore, "Proximity Detection of Candidate Companion Display Device in Same Room as Primary Display Using Camera", related U.S. Appl. No. 14/264,435, Applicant's response to Final Office Action dated Feb. 12, 2016.
Brant Candelore, "Proximity Detection of Candidate Companion Display Device in Same Room as Primary Display Using Sonic Signaling", related U.S. Appl. No. 14/278,383, Applicant's Non-Final Office Action dated Feb. 19, 2016.
Brant Candelore, "Proximity Detection of Candidate Companion Display Device in Same Room as Primary Display Using Infrared Signaling", related pending U.S. Appl. No. 14/202,309, applicants response to non-final office action dated May 25, 2016.
Brant Candelore, "Proximity Detection of Candidate Companion Display Device in Same Room as Primary Display Using Sonic Signaling", related pending U.S. Appl. No. 14/278,383 final office action dated May 3, 2016.
Brant L. Candelore, "Proximity Detection of Candidate Companion Display Device in Same Room as Primary Display Using Sonic Signaling", related pending U.S. Appl. No. 14/278,383, applicants response to final office action dated May 12, 2016.
Brant Candleore, "Proximity Detection of Candidate Companion Display Device in Same Room as Primary Display Using UPNP", related pending U.S. Appl. No. 14/262,051, non-final office action dated May 12, 2016.
Brant Candelore, "Proximity Detection of Candidate Companion Display Device in Same Room as Primary Display Using UPNP", related pending U.S. Appl. No. 14/202,309, non-final office action dated May 19, 2016.
Brant Candelore, "Proximity Detection of Candidate Companion Display Device in Same Room as Primary Display Using UPNP", related U.S. Appl. No. 14/262,051, Applicant's response to Non-final Office Action dated Jul. 20, 2016.
Sriram Sampathkumaran, "Recognizing and Registering Faces in Video", related U.S. Appl. No. 14/244,155, Applicant's response to Non-Final Office Action dated Jul. 21, 2016.
Brant Candleore, "Proximity Detection of Candidate Companion Display Device in Same Room as Primary Display Using Camera", related U.S. Appl. No. 14/264,435, Non-final office action dated Jun. 22, 2016.
Brant Candleore, "Proximity Detection of Candidate Companion Display Device in Same Room as Primary Display Using Camera", related U.S. Appl. No. 14/264,435, Applicant's response to Non-Final Office Action dated Jun. 23, 2016.
Brant Candelore, "Proximity Detection of Candidate Companion Display Device in Same Room as Primary Display Using Sonic Signaling", related U.S. Appl. No. 14/278,383, Non-final Office Action dated Jul. 18, 2016.
Brant Candelore, "Proximity Detection of Candidate Companion Display Device in Same Room as Primary Display Using Sonic Signaling", related U.S. Appl. No. 14/278,383, Applicant's response to Non-Final Office Action dated Jul. 18, 2016.
Brant Candelore, "Proximity Detection of Candidate Companion Display Device in Same Room as Primary Display Using Camera", related U.S. Appl. No. 14/264,435, Non-Final Office Action dated Jun. 22, 2016.
Brant Candelore, "Proximity Detection of Candidate Companion Display Device in Same Room as Primary Display Using Camera", related U.S. Appl. No. 14/264,435, Applicant's response to Non-Final Office Action dated Jun. 23, 2016.
Brant Candelore, "Proximity Detection of Candidate Companion Display Device in Same Room as Primary Display Using Camera", related U.S. Appl. No. 14/264,435, applicants response to non-final office action dated Jun. 7, 2017.
Brant Candelore, "Proximity Detection of Candidate Companion Display Device in Same Room as Primary Display Using Sonic Signaling", related pending U.S. Appl. No. 15/400,601, non-final office action dated Jun. 1, 2017.
Brant Candelore, "Proximity Detection of Candidate Companion Display Device in Same Room as Primary Display Using Sonic

(56) References Cited

OTHER PUBLICATIONS

Signaling", related pending U.S. Appl. No. 15/400,601, applicants response to non-final office action dated Jun. 12, 2017.
Sriram Sampathkumaran, "Recognizing and Registering Faces in Video", related U.S. Appl. No. 14/244,155, Non-Final Office Action dated May 3, 2017.
Sriram Sampathkumaran, "Recognizing and Registering Faces in Video", related U.S. Appl. No. 14/244,155, Applicant's response to the Non-Final Office Action filed May 11, 2017.
Sriram Sampathkumaran, "Recognizing and Registering Faces in Video", related U.S. Appl. No. 14/244,155, Final Office Action dated Nov. 8, 2016.
Sriram Sampathkumaran, "Recognizing and Registering Faces in Video", related U.S. Appl. No. 14/244,155, Applicant's response to Final Office Action dated Nov. 14, 2016.
Brant Candelore, "Proximity Detection of Candidate Companion Display Device in Same Room as Primary Display Using Camera", related U.S. Appl. No. 14/264,435, Non-Final Office Action dated Mar. 24, 2017.
Brant Candelore, "Proximity Detection of Candidate Companion Display Device in Same Room as Primary Display Using Camera", related U.S. Appl. No. 14/264,435, Final Office Action dated Sep. 27, 2017.
Brant Candelore, "Proximity Detection of Candidate Companion Display Device in Same Room as Primary Display Using Sonic Signaling", related U.S. Appl. No. 14/278,383, Final Office Action dated Dec. 6, 2016.
Brant Candelore, "Proximity Detection of Candidate Companion Display Device in Same Room as Primary Display Using Sonic Signaling", related U.S. Appl. No. 14/278,383, Applicant's response to Final Office Action dated Jan. 4, 2017.
Brant Candelore, "Proximity Detection of Candidate Companion Display Device in Same Room as Primary Display Using Camera", related U.S. Appl. No. 14/264,435, Applicant's response to the Final Office Action filed Oct. 7, 2016.
Brant Candelore, "Proximity Detection of Candidate Companion Display Device in Same Room as Primary Display Using Sonic Signaling", related U.S. Appl. No. 14/278,383, Non-Final Office Action dated Oct. 6, 2016.
Brant Candelore, "Proximity Detection of Candidate Companion Display Device in Same Room as Primary Display Using Sonic Signaling", related U.S. Appl. No. 14/278,383, Applicant's response to Non-Final Office Action dated Oct. 10, 2016.
Brant Candelore, "Proximity Detection of Candidate Companion Display Device in Same Room as Primary Display Using UPNP", related U.S. Appl. No. 14/262,051, Final Office Action dated Oct. 4, 2016.
Brant Candelore, "Proximity Detection of Candidate Companion Display Device in Same Room as Primary Display Using Camera", related U.S. Appl. No. 14/264,435, Final Office Action dated Sep. 23, 2016.
Sriram Sampathkumaran, "Recognizing and Registering Faces in Video", related U.S. Appl. No. 14/244,155, Final Office Action dated Jan. 25, 2018.

* cited by examiner

PROXIMITY DETECTION OF CANDIDATE COMPANION DISPLAY DEVICE IN SAME ROOM AS PRIMARY DISPLAY USING LOW ENERGY BLUETOOTH

FIELD OF THE INVENTION

The application relates generally to determining that a candidate companion display device is in the same room as a primary display using low energy Bluetooth.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

An example ecosystem that is pertinent here is a home entertainment ecosystem that includes a TV and various nearby display devices such as wireless communication devices.

SUMMARY OF THE INVENTION

As understood herein, to pair the TV with a device in the home ecosystem for use as a "companion" device to the TV, typically a user must select a device from a long list of ecosystem devices, in the home and in many cases those in neighboring homes, which might have been discovered wirelessly. Usually, it is up to the user (a human) to figure out which devices are in the home let alone the same room.

Present principles are directed to allowing a primary display device (PDD) such as an audio video display device (AVDD) such as a TV to discover candidate companion screen devices (CCSD), e.g., tablet computers, wireless telephones, and the like that are not just present in the home ecosystem but that also are in the same room as the PDD. This promotes intelligently selecting which one of multiple CCSDs to select for presenting ancillary content related to primary content being shown on the PDD, as CCSDs outside the room in which the PDD is located are not as useful or even desirable to show ancillary content when the user of the outside-the-room device cannot see the PDD. The PDD can send a CCSD in the same room as the PDD a message about whether the user desires to have ancillary data presented on the CCSD.

It should be noted that the PDD may be established by a device with a relatively small display such as a wireless tablet, if it is the device of focus with content that is playing. In this scenario, the CCSD may be established by, for example, a larger screen TV without affecting present principles.

Accordingly, a device includes at least one computer readable storage medium bearing instructions executable by a processor, and at least one processor configured for accessing the computer readable storage medium to execute the instructions to configure the processor for causing the device to receive a Bluetooth low energy (BLE) signal from a display apparatus. Responsive to receiving the BLE signal, the processor when executing the instructions is configured for presenting a user interface (UI) on a display enabling a user of the device to cause the display apparatus to present ancillary content related to primary content which the device is configured to display.

The BLE signal may be transmitted with a power of no more than ten milliWatts and may identify a network name of the display apparatus and/or a location in a building of the display apparatus. Responsive to receiving the BLE signal from the display apparatus, the processor when executing the instructions may be configured to cause the device to establish communication with the display apparatus over a link that is not a BLE link. The link that is not a BLE link may include a Wi-Fi link and/or an Ethernet link. If desired, the processor when executing the instructions may be configured for, in response to the BLE signal, presenting on the UI an indication only of the display apparatus and not presenting indications of other apparatuses detected by the device to be present on a local network but not detected by the device to be originators of a BLE signal.

In another aspect, a method includes receiving from a display apparatus a radiofrequency (RF) signal transmitted with a transmission power of no more than ten milliWatts and having a frequency of between one and three gigahertz, inclusive. The method also includes, responsive to receiving the RF signal at a device, presenting a user interface (UI) on a display enabling a user of the device to cause the display apparatus to present ancillary content related to primary content which the device is configured to display.

In another aspect, a display apparatus includes at least one computer readable storage medium bearing instructions executable by a processor, and at least one processor configured for accessing the computer readable storage medium to execute the instructions to configure the processor for causing the display apparatus to transmit a Bluetooth low energy (BLE) signal. The processor when executing the instructions is configured for, responsive to a device receiving the BLE signal, receiving from the device ancillary content related to primary content which the device is configured to display, and/or receiving from the device a link to the ancillary content for display thereof on the display apparatus.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1:
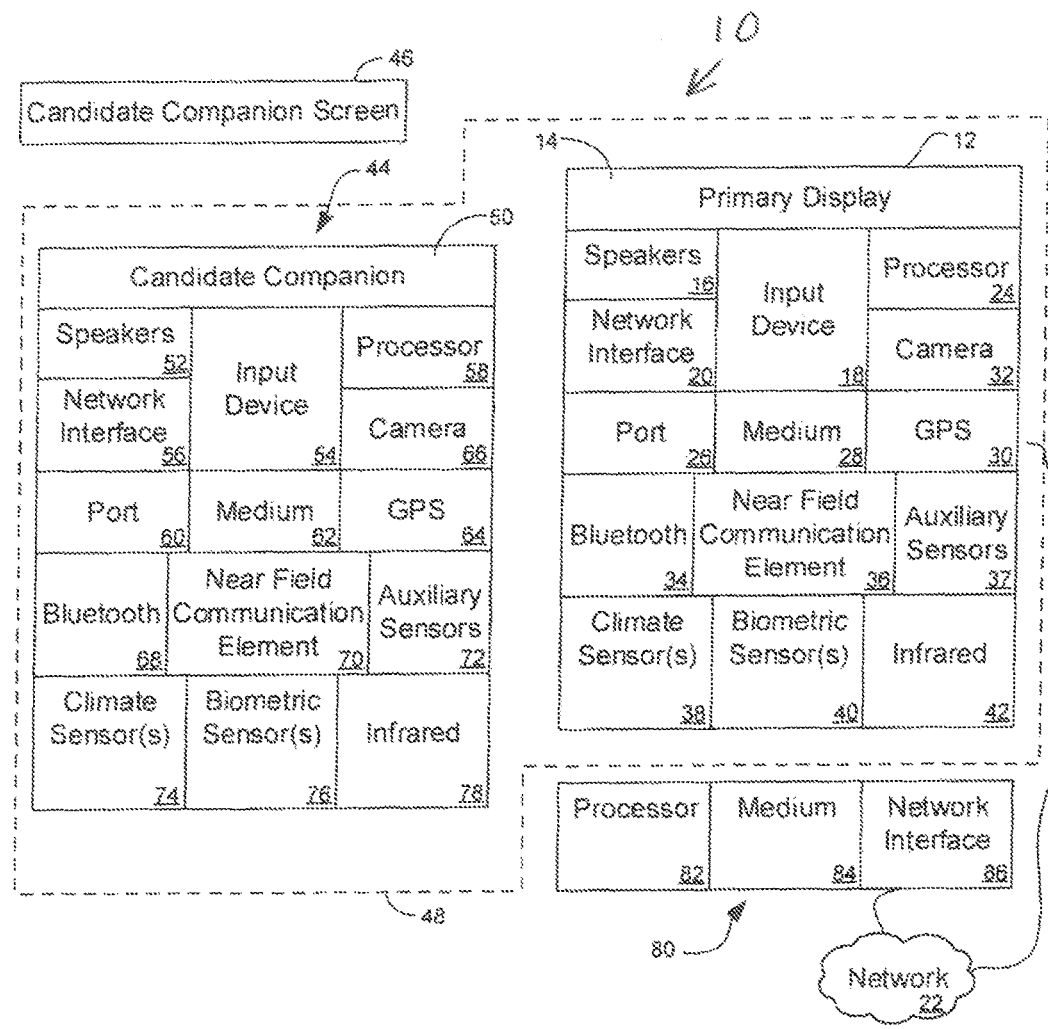
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a user through the headphones. The AVDD 12 may further include one or more tangible computer readable storage medium 28 such as disk-based or solid state storage. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth module 34 and other Near Field Communication (NFC) element 36 for communication with other devices using Bluetooth and/or NFC technology, respectively. An example NFC element can be a radio frequency identification (RFID) element. Note that the elements 34, 36, like other appropriate elements herein described, may be incorporated within a housing or chassis of the associated device or be provided as a universal serial bus (USB) 2/3 dongle device.

With respect to the Bluetooth module 34, it may be implemented as a Bluetooth Low Energy (BLE) module and/or a Bluetooth 4.0 module that implements communications using either or both of the BLE and standard Bluetooth systems. As understood herein, BLE operates in the same spectrum range (the 2.400 GHz-2.4835 GHz band) as classic Bluetooth technology, but uses a different set of channels. Instead of Bluetooth's seventy nine 1-MHz channels, BLE employ forty 2-MHz channels. BLE sends data within a channel using Gaussian frequency shift modulation with a one megabyte per second data rate and a maximum transmission power of ten milliWatts (10 mW).

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types that may establish candidate companion screen devices for the primary display device established by the AVDD 12. In one example, a first candidate companion screen device is established by a first CE device 44 while a second companion screen device may be established by a second CE device 46 which may include similar components as the first CE device 44 and hence will not be discussed in detail. In the example shown, only two CE devices 44, 46 are shown as candidate companion screen devices, it being understood that only one candidate companion screen device or more than two candidate companion screen devices may be used.

In the example shown, to illustrate present principles all three devices 12, 44, 46 are assumed to be members of a home entertainment network in a dwelling or at least to be present in proximity to each other in a location such as a house. However, for illustrating present principles the first CE device 44 is assumed to be in the same room as the AVDD 12, bounded by walls illustrated by dashed lines 48, whereas the second CE device 46, while not being necessarily further from the AVDD 12 as is the first CE device 44 and in fact while potentially being closer to the AVDD 12 than is the first CE device 44, is outside the room bounded by the walls 48.

The example non-limiting first CE device 44 may be established by any one of the above-mentioned devices and accordingly may have one or more of the components described below. Specifically, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles.

Also included on the first CE device 44 may be a Bluetooth module 68 and other Near Field Communication (NFC) element 70 for communication with other devices using Bluetooth and/or NFC technology, respectively. An example NFC element can be a radio frequency identification (RFID) element. The Bluetooth module 68 may be substantially similar in configuration and use to the Bluetooth module 34 of the PDD.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments.

Figure 2:
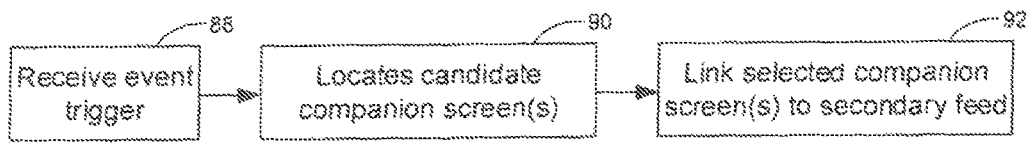
FIGS. 2 and 3 are flow charts showing example algorithms according to present principles.

FIG. 2 shows overall logic according to present principles. In some examples an event trigger may be received at block 88 to activate the ensuing logic. For example, a particular actor or product or sound may appear or program change in a broadcast channel being presented on the AVDD 12 as indicated by metadata in the program, or by recognition of demanded images by the AVDD processor 24, or by recognition of sounds presented on the AVDD 12 speakers 16 as detected by the microphone 18 and analyzed by the processor 24 either in a standalone mode and/or by uploading the images/sounds to the cloud server 80 for analysis, which sends the analysis results back to the AVDD 12. Or, using detection principles below the AVDD 12 may recognize that a candidate companion device 44 or 46 has been carried into the room in which the AVDD 12 is disposed, using such recognition as a trigger.

In any case, as set forth further below at block 90 the AVDD 12 locates candidate companion screens that are in the same room as the AVDD 12, screening out candidate companion screens that may be nearby but outside the walls 48. At block 92 one or more candidate companion screens that are detected as being in the same room as the AVDD 12 are provided with ancillary feed(s) related to the program being presented on the AVDD 12 by, e.g., linking the companion screen(s) to a computer site associated with the program being presented on the AVDD 12. This linking may entail simply providing a network address or link from the AVDD 12 to the companion screen which a user can select to cause a network browser to access a computer network site on the home network, on the PDD itself, or on the Internet supplying the ancillary feed/content/data (used interchangeably), or the linking may be more automated, e.g., the AVDD may command the companion screen device to automatically access a particular network site and automatically commence downloading the ancillary feed/content/data without any user action to accomplish this.

Note that the logic of FIG. 2 may be employed by the CCSD to locate a PDD to which to "throw" content along the lines described above.

Figure 3:
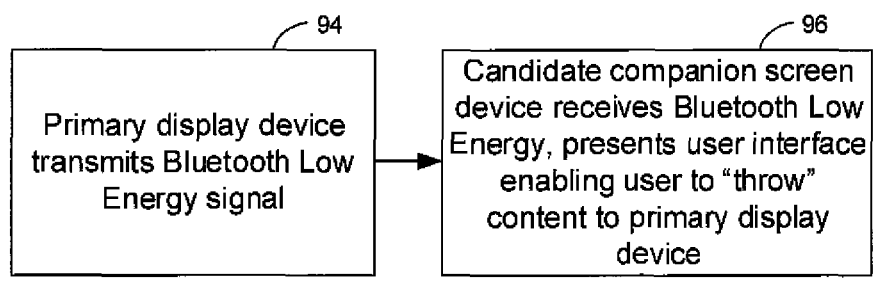

FIG. 3 illustrates example logic. Commencing at block 94, the PDD 12 transmits, using the Bluetooth module 34, a BLE signal with a transmission power of ten milliWatts or less, so that the likelihood of a CCSD detecting the BLE signal is low unless the CCSD is in the same room as the PDD. The BLE signal may identify a network name of the PDD and may optionally identify a location in the home of the PDD as previously programmed by a user, e.g., "AVDD in living room" or "AVDD in garage".

Figure 4:
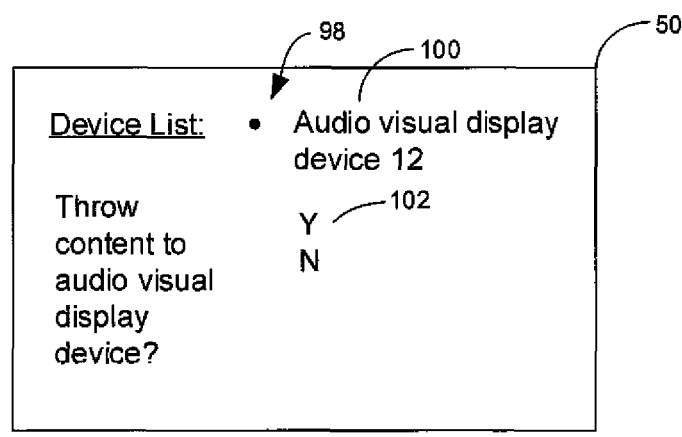
FIGS. 4-7 are example screen shots according to present principles.

At block 96, a CCSD device that has received the BLE signal from the PDD may in response to the BLE signal present on its display 50 a user interface (UI) which gives a user of the CCSD the option of providing content to the PDD. FIG. 4 illustrates an example UI 98 according to principles above. Note that upon receipt of the BLE signal, the CCSD may employ device discovery/linking principles using Wi-Fi or Ethernet using universal plug-and-play (UPnP) and/or digital living network alliance (DLNA) protocols, with which to share information with the PDD. In other words, initial contact to precipitate the logic may be made using BLE and then once this has been accomplished, indicating that the two devices are in the same room as each other, further communication may be established over a longer-range and typically more powerful communication link than BLE.

Preferably, the example UI 98 shown in FIG. 4 presents at 100, as a possible target for content, only the PDD that sent the BLE signal to avoid clutter and confusion on the part of the user. That is, responsive to receiving a BLE signal, the UI presented on the display 50 of the CCSD lists only sources (typically only one) of BLE signals. Without this feature the CCSD might otherwise display all the devices that it detects on the network, confusing the user with device listings of devices in other rooms to which it would make little sense to "throw content". A selector 102 may be presented to permit the CCSD to "throw" content to the PDD (e.g., the AVDD 12) either by providing a network link to the content to the PDD, and/or by streaming content directly from the CCSD to the PDD, and/or by causing the PDD to automatically download content from a content source such as a TV station (via cable, satellite, or over the air broadcast), computer network source, etc. without further user interaction.

The above scenario can be symmetrical in that at block 94 the CCSD may transmit a BLE signal and if received by the PDD, in response at block 96 the PDD may present a UI such as that shown in FIG. 4 on its display to permit the PDD to "throw content" to the CCSD as a companion screen.

In some embodiments, if the user selects the "yes" selector 102 of FIG. 4, a message may be sent from the CCSD (e.g., through the Bluetooth module or NFC element 36 or network interface or the IR element) to the PDD (using, for example, the appropriate network address thereof) soliciting use of the PDD as a companion screen to the CCSD. An example of such a message is shown further below. The logic of block 92 in FIG. 2 may then be employed if the user of the solicited PDD accepts the solicitation. Of course, when the logic of FIG. 3 is reversed and the CCSD sends BLE signal that the PDD receives, the discussion of this paragraph likewise is reversed in that the PDD responsive to selection of a "yes" selector element can solicit the CCSD as a companion screen.

Note that if multiple companion screens exist to which to "throw" content, each such companion screen may be solicited or only the companion screen with the strongest BLE signal strength may solicited. Or, only companion screens of a particular model may be solicited.

In addition, a companion screen identified using BLE may be caused (as by command from the "throwing" device) to automatically access a particular network site (as identified, e.g., by metadata accompanying the primary content) and to automatically commence downloading the ancillary feed/content/data without any user action to accomplish this.

Figure 5:
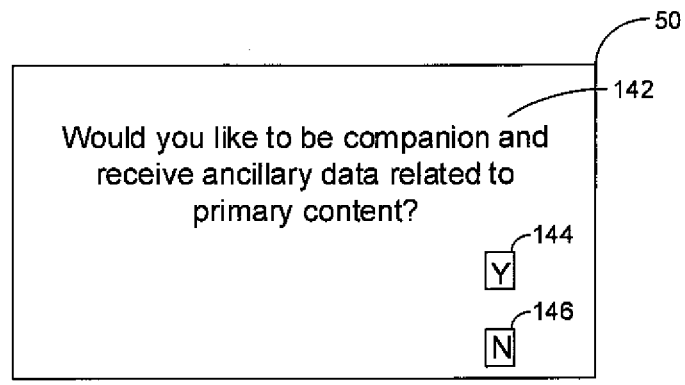

FIG. 5 shows an example UI presenting an example solicitation message 142 on a display 50 of a CCSD which transmitted a BLE signal that was received by a PDD and which was selected according to principles above as a companion screen, it being understood that when the PDD originates the BLE signal and is selected by a CCSD to be a companion screen, the UIs described below may be presented on the PDD. A user may select a "yes" selector element 144 to accept the CCSD to be a companion screen to the PDD, in which case the PDD may send a link to the CCSD to a computer site or broadcast site or other site to download ancillary content or provide the ancillary content itself from data that it is receiving but not displaying on the primary display 14. Or, in response to selecting the selector 144 the PDD may automatically cause the CCSD to automatically and without user interaction begin downloading the ancillary content as described above. The user can decline to have the CCSD used as a companion device by selecting a "no" selector element 146.

Figure 6:
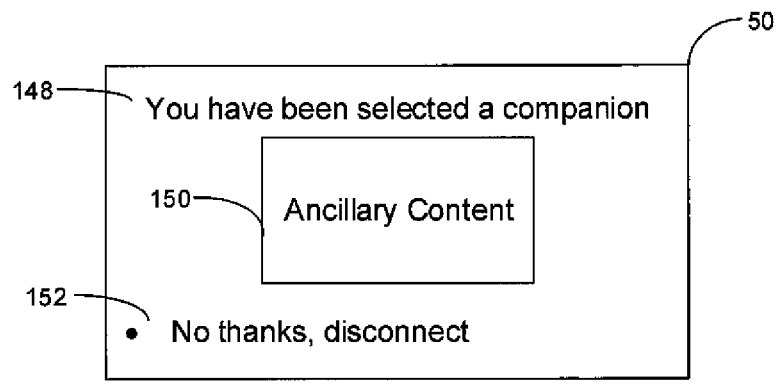

FIG. 6 illustrates a UI that can be presented on a display 50 of a CCSD pursuant to any one of "automatic linking" logic described above. As shown, a message 148 may inform the user of the CCSD that the CCSD has been selected as a companion device, and a window 150 of the display 50 is used to present the ancillary content. A decline selector 152 may be presented which when selected disconnects or otherwise disables, at least temporarily, the CCSD from use as a companion screen to the PDD.

Figure 7:
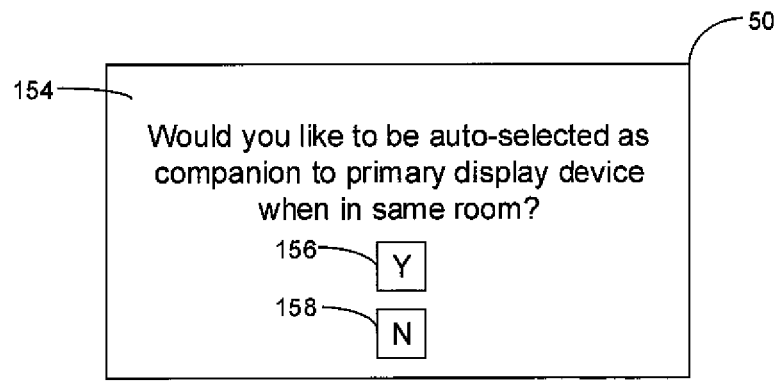

FIG. 7 illustrates an example UI that can be presented on a display 50 of a CCSD in a set-up mode to essentially allow the user to select between the two modes embodied in FIGS. 5 and 6. A message 154 may be presented asking the user if the user would like the CCSD to be subject to automatic selection as a companion screen to the PDD when the CCSD is in the same room as the PDD. A yes selector 156 enables a user to select this feature, while a no selector 158 enables a user to decline automatic selection of the CCSD as a companion screen.

While the particular PROXIMITY DETECTION OF CANDIDATE COMPANION DISPLAY DEVICE IN SAME ROOM AS PRIMARY DISPLAY USING LOW ENERGY BLUETOOTH is herein shown and described in detail, it is to be understood that the subject matter which is encompassed by the present invention is limited only by the claims.

What is claimed is:
1. A system comprising:
at least one primary display device (PDD) configured with first instructions executable by at least one PDD processor;
at least one companion device (CD) configured with second instructions executable by at least one CD processor;
the first instructions being executable by the PDD processor to:
receive an event trigger established by a particular actor or product or sound in content presented by the PDD as indicated by metadata in the content, or as indicated by recognition of demanded images, or as indicated by recognition of sounds presented on the PDD in a standalone mode and/or by uploading the images/sounds to a server for analysis, which sends analysis results back to the PDD;
responsive to the event trigger, locate candidate companion screens that are in the same room as the PDD at least in part using a first signal;
screen out candidate companion screens that are nearby the PDD but outside walls enclosing a space in which the PDD is disposed;
provide at least a first candidate companion screen (FCCS) detected as being in the space with ancillary content related to the content presented on the PDD by linking the FCCS to a computer site associated with the content being presented on the PDD, the linking comprising providing a network address or link from the PDD to the FCCS selectable to access a computer network site on a home network, on the PDD itself, or on the Internet supplying the ancillary content, or the linking comprising sending a signal from the PDD to the FCCS to automatically access a particular network site and automatically commence downloading the ancillary content without any user action;
wherein the CD comprises the FCCS, and the second instructions are executable by the CD processor to:
responsive to receiving the first signal from the PDD, execute device discovery using a second signal having higher energy than the first signal, and present at least one user interface (UI) comprising an indication of the PDD that sent the first signal and not other devices detected during device discovery, the UI also comprising a first selector selectable to permit the CD to "throw" content to the PDD;

responsive to selection of the first selector, send a message to the PDD soliciting use of the PDD as a companion screen to the CD.

2. The system of claim 1, wherein the event trigger is established by a particular actor or product or sound in content presented by the PDD as indicated by metadata in the content.

3. The system of claim 1, wherein the event trigger is established by recognition of demanded images.

4. The system of claim 1, wherein the event tri is established by sounds presented on the PDD in a standalone mode.

5. The system of claim 1, wherein the event trigger is established by uploading the images/sounds to a server for analysis, which sends analysis results back to the PDD.

6. The system of claim 1, wherein the linking comprises providing a network address or link from the PDD to the FCCS selectable to access a computer network site on a home network, on the PDD itself, or on the Internet supplying the ancillary content.

7. The system of claim 1, wherein the linking comprises sending a signal from the PDD to the FCCS to automatically access a particular network site and automatically commence downloading the ancillary content without any user action.

8. The system of claim 7, wherein the second instructions are executable to, responsive to receiving the signal from the PDD to automatically access a particular network site and automatically commence downloading the ancillary content without any user action, present at least a presentation on the CD indicating that the CD has been selected as a companion device, and a window to present the ancillary content, the presentation further comprising a decline selector selectable to terminate use of the CD as a companion screen to the PDD.

9. The system of claim 1, wherein the first signal is a Bluetooth low energy (BLE) signal.

10. The system of claim 9, wherein the BLE signal conveys information presentable with human readable indicia indicating a room.

11. The system of claim 9, wherein the BLE signal conveys information indicating a unique number of a BLE transmitter or network name of the PDD.

12. The system of claim 1, wherein the CD is configured to transmit a CD signal having a protocol of the first signal to the PDD to cause the PDD to present a UI to permit the PDD to throw content to the CD.

13. The system of claim 1, wherein responsive to detecting plural candidate companion screens, the first instructions are executable to solicit each of the plural candidate companion screens to be a companion scree of the PDD.

14. The system of claim 1, wherein responsive to detecting plural candidate companion screens, the first instructions are executable to solicit only a candidate companion screen having a stronger signal strength than other candidate companion screens.

15. The system of claim 1, wherein responsive to detecting plural candidate companion screens, the first instructions are executable to solicit only candidate companion screens of a particular type.

16. The system of claim 1, wherein the second instructions are executable to present a solicitation message on the CD along with a first selector element selectable to accept the CD to be a companion screen to the PDD and cause the CD to present the ancillary content and a second selector element selectable to decline the CD from being a companion screen to the PDD.

17. The system of claim 1, wherein the second instructions are executable to present a presentation on the CD, the presentation comprising a first selector element selectable to make the CD subject to automatic selection as a companion screen to the PDD and a second selector element selectable to decline automatic selection of the CD as a companion screen.

18. A system comprising:
at least one primary display device (PDD) configured with first instructions executable by at least one PDD processor;
at least one companion device (CD) configured with second instructions executable by at least one CD processor;
the second instructions being executable by the CD processor to:
receive an event trigger established by a particular actor or product or sound in content presented by the CD as indicated by metadata in the content, or as indicated by recognition of demanded images, or as indicated by recognition of sounds presented on the CD in a standalone mode and/or by uploading the images/sounds to a server for analysis, which sends analysis results back to the CD;
responsive to the event trigger, locate candidate companion screens that are in the same room as the CD at least in part using a first signal;
screen out candidate companion screens that are nearby the CD but outside walls enclosing a space in which the CD is disposed;
provide at least a first candidate companion screen (FCCS) detected as being in the space with ancillary content related to the content being presented on the CD by linking the FCCS to a computer site associated with the content being presented on the CD, the linking comprising providing a network address or link from the CD to the FCCS selectable to access a computer network site on a home network, on the CD itself, or on the Internet supplying the ancillary content, or the linking comprising sending a signal from the CD to the FCCS to automatically access a particular network site and automatically commence downloading the ancillary content without any user action;
wherein the FDD comprises the FCCS, and the first instructions are executable by the FDD processor to:
responsive to receiving the first signal from the CD, execute device discovery using a second signal having higher energy than the first signal, and present at least one user interface (UI) comprising an indication of the CD that sent the first signal and not other devices detected during device discovery, the UI also comprising a first selector selectable to permit the PDD to "throw" content to the CD;
responsive to selection of the first selector, send a message to the CD soliciting use of the CD as a companion screen to the PDD.

* * * * *